(12) United States Patent
Shintani (10) Patent No.: US 8,610,764 B2
(45) Date of Patent: Dec. 17, 2013

(54) SHUTTER GLASSES REPEATER

(75) Inventor: Peter Rae Shintani, San Diego, CA (US)

(73) Assignee: Sony Corporation, Tokyo (JP)

( * ) Notice: Subject to any disclaimer, the term of this patent is extended or adjusted under 35 U.S.C. 154(b) by 437 days.

(21) Appl. No.: 12/803,923

(22) Filed: Jul. 9, 2010

(65) Prior Publication Data

US 2012/0007968 A1 Jan. 12, 2012

(51) Int. Cl.
*H04N 13/04* (2006.01)

(52) U.S. Cl.
USPC .......................................................... 348/56

(58) Field of Classification Search
CPC ................................. H04N 7/00; H04N 13/04
USPC ...................................................... 348/36, 56
IPC ........................................................ H04N 7/00
See application file for complete search history.

(56) References Cited

U.S. PATENT DOCUMENTS

| | | | |
|---|---|---|---|
| 5,796,373 A | 8/1998 | Ming-Yen | |
| 6,400,968 B1 * | 6/2002 | White et al. | 455/572 |
| 6,684,062 B1 * | 1/2004 | Gosior et al. | 455/73 |
| 6,727,867 B2 | 4/2004 | Divelbiss et al. | |
| 7,114,809 B2 | 10/2006 | Palovuori | |
| 7,405,801 B2 | 7/2008 | Jacobs | |
| 7,509,057 B2 * | 3/2009 | Grace | 398/201 |
| 7,603,080 B2 | 10/2009 | Richenstein et al. | |
| 2005/0116881 A1 * | 6/2005 | Divelbiss et al. | 345/7 |
| 2008/0062338 A1 * | 3/2008 | Herzog et al. | 349/13 |
| 2008/0303963 A1 | 12/2008 | Jung et al. | |
| 2009/0091708 A1 | 4/2009 | Greene | |
| 2010/0074594 A1 | 3/2010 | Nakamura et al. | |
| 2011/0025821 A1 * | 2/2011 | Curtis et al. | 348/43 |

FOREIGN PATENT DOCUMENTS

WO  WO 2009/033136  3/2009

OTHER PUBLICATIONS

International Search Report and Written Opinion, Corresponding PCT Application No. PCT/US2011/041636, dated Nov. 1, 2011.
Kris Sangani, "Gadget Speak," Knowledge Network, Feb. 16, 2009.
Mihir Patkar, "How 3D TV Works: Part I—With Glasses," Think Digit, Oct. 20, 2009.
Tomi Engdahl, "3D Glasses and other 3D Display Devices," 1996-1997.
Lisa Litherland, "CUBE 3D Glasses," Dec. 4, 2001.

* cited by examiner

*Primary Examiner* — Y Lee
*Assistant Examiner* — Francis G Geroleo
(74) *Attorney, Agent, or Firm* — Miller Patent Services; Jerry A. Miller (57) ABSTRACT

A method, consistent with certain implementations involves at a television remote controller housing that provides a user interface that provides access to controls for television functions and encloses a television remote controller circuit: receiving a 3D shutter glasses synchronization signal; and re-transmitting the shutter glasses synchronization signal. This abstract is not to be considered limiting, since other embodiments may deviate from the features described in this abstract.

28 Claims, 4 Drawing Sheets

SHUTTER GLASSES REPEATER

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Many three dimensional (3D) display systems depend upon the use of actively controlled shuttered glasses. The most expedient control method is to use an infrared (IR) control signal to synchronize the glasses to the display. Since there are limits to the optical output power of an IR transmitter (IR blaster) to control the active glasses, at this writing, the current range and reliability of communication between a 3D television display and active shuttered 3D glasses are marginal. The problem is further complicated by the current safety requirements for total optical power and optical power density, which can be used in the IR blaster which transmits the synchronizing signal the user's shuttered glasses.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The term 3D or three dimensional as used herein is intended to apply to stereoscopic three dimensional visual experiences as experienced on a 3D enabled television set for a viewer that wishes to view 3D program content or other content on the 3D enabled television. Such experiences can be created in a number of ways including use of images that are separately polarized for each eye or color filtered for each eye. In particular, within the context of implementations consistent with the present invention, three dimensional visual experiences are created by generation and display of separate left eye and right eye image. Such images are viewed on a display device that presents separate images for each eye, where alternating synchronized blocking and passing of the images viewed by each eye is used to create separation of the left eye and right eye images, thereby producing the stereoscopic three dimensional visual experience illusion.

As previously noted, many 3D display systems depend upon the use of actively controlled shuttered glasses. The most expedient control method is to use an infrared (IR) control signal to synchronize the glasses to the display. Since there are limits to the optical output power of an IR transmitter (IR blaster) to control the active glasses, at this writing, the current range and reliability of communication between a 3D television display and active shuttered 3D glasses are marginal. The problem is further complicated by the current safety requirements for total optical power and optical power density, which can be used in the IR blaster which transmits the synchronizing signal the user's shuttered glasses.

In order to minimize the above problems, one could deploy a repeater device that receives the IR synchronization signal and retransmit the signal in a manner so as to improve the area covered by the IR synchronization signal. However, such a repeater may be inconvenient or unsightly to locate in a television viewing environment. However, it is noted that the television viewer commonly has a remote control unit close at hand. Hence in accord with certain embodiments consistent with the present invention, the IR repeater functionality can be integrated into the remote control unit. In addition to the likely placement of such a remote controller close to the user, problems with reception of the synchronization IR signal can be minimized by integrating the repeater with the remote controller. The remote control unit could be merely an IR repeater or an RF to IR bridge type of repeater. Since the distance from the remote control to the user's glasses would be short, the radiated power could be quite low, and hence the impact on the battery life of the remote control is manageable. The IR blaster forming a part of both the television set and the remote controller can be of lower power and more easily concealed in the product and or display.

Hence, in accord with implementations consistent with the present invention, a method and apparatus is provided for improving the range of actively controlled shutter glasses used in 3D TV display systems. Typically, the shutter glass is controlled by IR signals which synchronize the glass with the display. But IR signals have low output power. In order to improve the working range of the shutter glass, two methods have been proposed. One method relates to replacing the IR signal with a radio frequency (RF) link. Another method relates to using a first repeater which translates the IR signal into a RF signal and a second repeater which translates the RF signal back to the IR signal. The repeater could be incorporated within the remote control.

Hence, the range of actively controlled shutter glasses used in 3D systems can be improved by incorporating an RF link instead of IR signal. Alternatively, the range of actively controlled shutter glasses used in 3D systems that use IR link by incorporating repeaters which translate IR signal to RF signal at the display end and translating the RF signal back to IR signal at the viewer end. As a further alternative, the repeater can simply be an IR signal repeater that receives and transmits IR.

Figure 1:
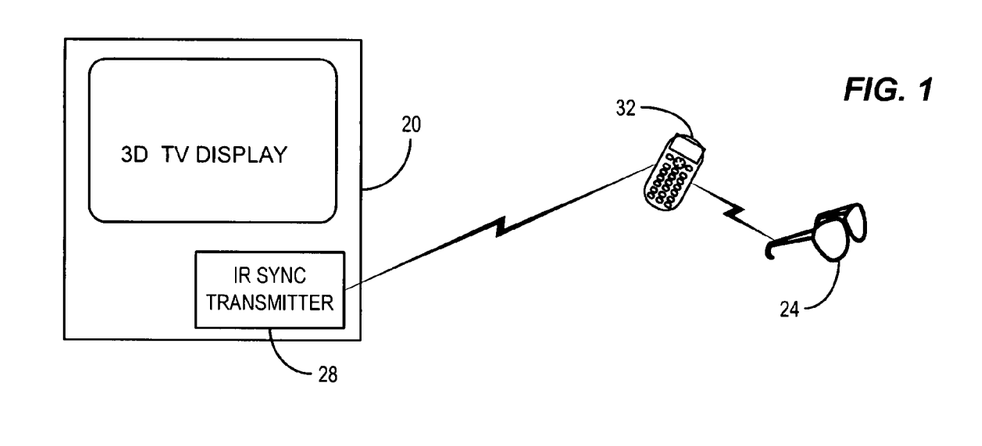
FIG. 1 illustrates an example remote controller IR repeater arrangement consistent with certain embodiments of the present invention.

Turning now to FIG. 1, an example system for providing synchronization signals from a television 20 to a set of shutter glasses 24 is depicted in a manner consistent with certain implementations of the present invention. In this example, the 3D television display 20 includes an infrared shutter glasses synchronization signal transmitter 28 which transmits signals intended for shutter glasses in order to synchronize the video frames displayed on display 20 with the user's eyes. In this manner, left eye images are provided when the shutter glasses 24 permit left eye images to pass and inhibit right eye images and vice versa. However, since the range of the IR signal is limited and subject to interference by intermediate objects or, for example, people passing through the IR beam from transmitter 28, sometimes synchronization may be lost resulting in jittery or distorted images. While some amount of "flywheeling" can be provided in the glasses so that brief interruptions of the image can be tolerated by use of a local oscillator that is locked onto the synchronization signal, the interruption of the sync signal can be problematic.

In order to ameliorate this problem, the remote controller 32 can be arranged to include a repeater that receives the IR synchronization signal from transmitter 28, and re-transmits the IR signal to the shutter glasses. Since the remote controller 32 is frequently close to the user, re-transmissions are likely to be of high quality in terms of received IR signal strength. Additionally, disruptions caused by moving people or objects in the room are less likely to interfere with the user's receipt at the shutter glasses of a sync signal that may be emanating from a different place (i.e., the location of the remote controller 32.

Figure 2:
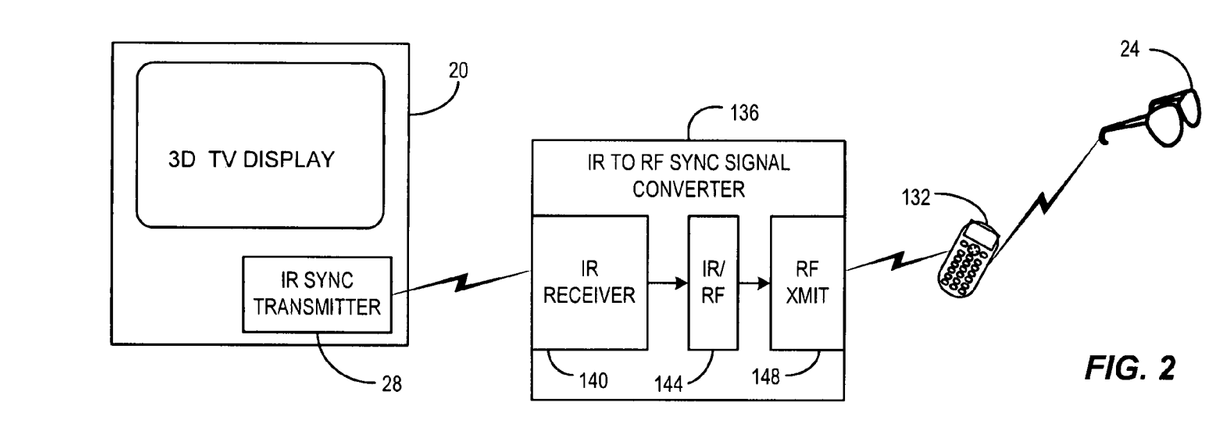
FIG. 2 illustrates an example remote controller repeater using an RF conversion intermediate link in a manner consistent with certain embodiments of the present invention.

The impact of low signal quality can be further enhanced by introducing an intermediate radio frequency (RF) link in the synchronization signal from the transmitter 28 as depicted in FIG. 2. In this example, the IR signal is received by an IR to RF sync signal converter 136 which receives the IR sync signal from the transmitter 28 at IR receiver 140, converts the IR sync signal to an RF sync signal at IR to RF converter 144 and then transmits the sync signal at 148 to remote controller 132. The remote controller 132 incorporates therein a circuit for converting the RF sync signal to an IR sync signal and retransmits the IR synchronization signal to glasses 24. Since the RF link is more omnidirectional and can be of improved range, the robustness of the synchronization signal can be significantly improved.

Figure 3:
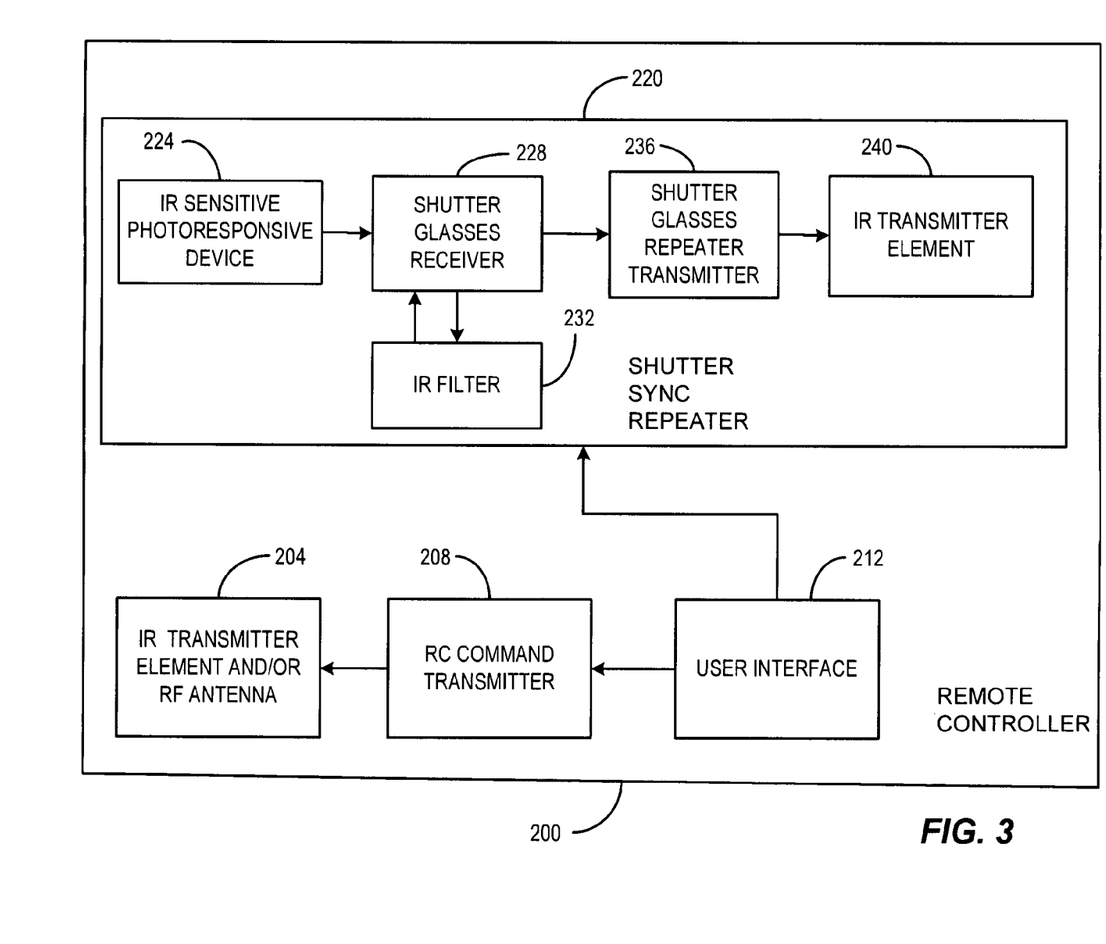
FIG. 3 is a block diagram of an example combination remote controller and shutter glasses sync repeater consistent with certain embodiments of the present invention.

A remote controller 32 as depicted in FIG. 1 is depicted in block diagram form in FIG. 3. The remote controller 200 has remote controller circuitry that is similar to existing remote controller circuitry. Such circuitry is represented by a transmitter that includes a transmitter element 204 and a remote control command transmitter 208 that can transmit commands in the form of either IR or RF commands to the television display to implement such actions as turn on and off, volume change, channel change, etc. Such commands are transmitted as a result of a user entering commands at a user interface 212 to effect any conventional action. While not shown explicitly, the commands can be carried out using a programmed processor or hard wired processor in any conventional manner.

In addition, the remote controller is outfitted with an integral shutter synchronization repeater 220 which, in this example, receives IR sync signals and retransmits them to the shutter glasses. In order to provide this functionality without requiring a separate device, the remote controller circuitry and the repeater 220 are co-located within the remote controller's housing. In certain embodiments, the remote controller's user interface 212 can provide controls to the repeater 220 such as an on/off function or even a power control to regulate the amount of power used to retransmit the IR sync signal. Each of the elements shown within block 200 represent functional blocks housed within the same remote controller housing.

The sync repeater 220 receives IR sync signals at an IR sensitive photoresponsive device such as a photo diode 224. This signal is received at a shutter glasses receiver which decodes the signal from the device 220 and utilizes filtering or other processing at 232 to isolate the sync signal. The receiver 228 then passes the sync signal to a transmitter 236 for retransmission in order to provide a repeater function using an IR transmitter element 240 such as an IR LED or other IR source device.

It is noted that IR signals used by a remote controller is commonly in the lower frequency range of the IR-A spectrum (e.g., such as approximately 940 nm) while IR signals used by a 3D synchronization signal transmitter is commonly higher in the IR-A spectrum (e.g., such as approximately 850-880 nm).

Figure 4:
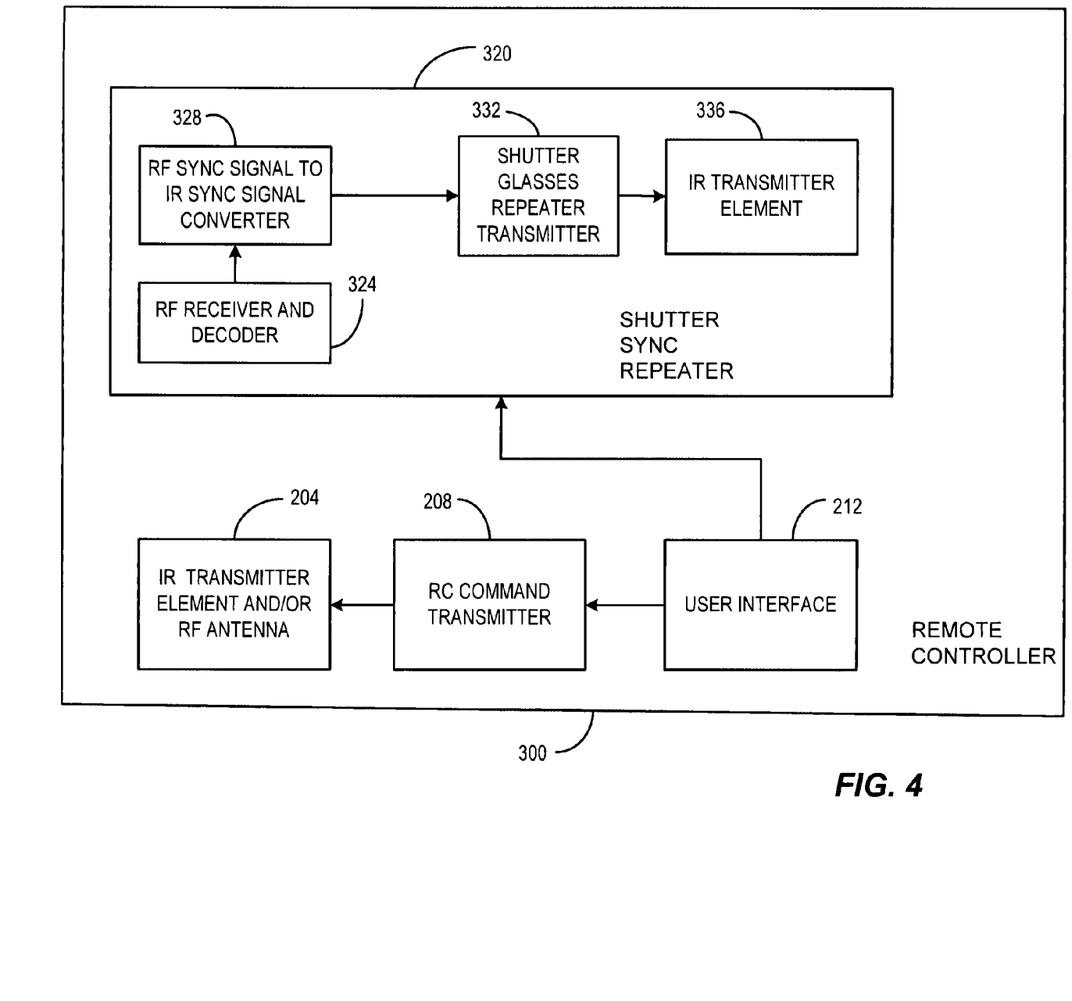
FIG. 4 is another block diagram of an example combination remote controller and shutter glasses sync repeater consistent with certain embodiments of the present invention.

A combined remote controller and sync signal repeater consistent with that of FIG. 2 is depicted in FIG. 4 where the remote controller functional blocks as represented by 204, 208 and 212 offer the same or similar functionality. Within the remote controller housing (which encloses all of the elements inside block 300). In this implementation, the example sync repeater is shown as 320 and the sync signal is modulated on an RF signal which is received and decoded by RF receiver and decoder 324. This decoded signal is then converted to a sync signal at 328 suitable for transmission to the shutter glasses at repeater transmitter 332 by use of an IR transmitter element 336 such as an IR LED as previously described. Also as previously described, various functions of the repeater can be controlled or enabled or disabled using the user interface 212. Any suitable RF frequency band can be used such as the 300 MHz band, ISM bands (902-928 Mhz, 2.4 GHz ...), etc.

Figure 5:
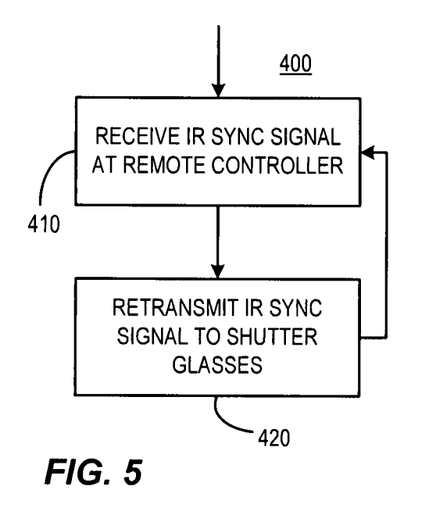
FIG. 5 is an example process consistent with certain embodiments of the present invention.

Referring now to FIG. 5, the basic process of the repeater function as depicted in FIG. 1 is shown as process 400. where the IR sync signal is received at the remote controller which also serves as a repeater device at 410. The remote controller then repeats or retransmits the IR sync signal to the shutter glasses at 420 and this process operates continuously.

Figure 6:
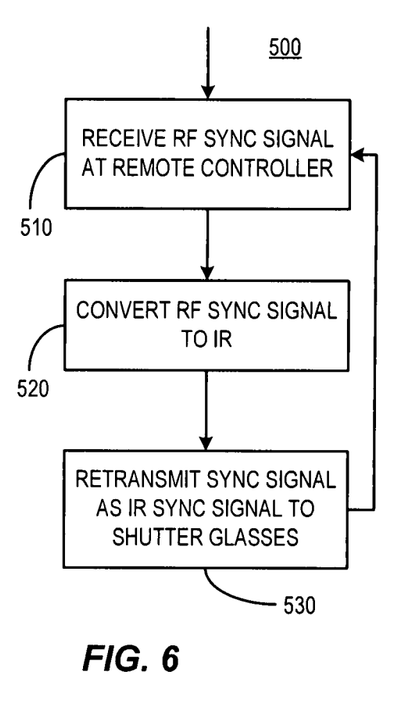
FIG. 6 is another example process consistent with certain embodiments of the present invention.

Referring now to FIG. 6, the basic process of the repeater function as depicted in FIG. 2 is shown as process 500, where the RF sync signal from a converter/repeater such as 136 is received at the remote controller which also serves as a repeater device at 510. The RF signal is then converted to an IR sync signal at 520 for retransmission. The remote controller then repeats or retransmits the IR sync signal to the shutter glasses at 530 and this process operates continuously.

Many variations in the presently disclosed implementations are possible without departing from embodiments consistent with the present invention. For example, in one variation, in addition to providing repeater functions, the repeater can be enabled to carry out a translation function. Currently, there is no standardization between various manufacturers for their IR signaling for synchronization of shutter glasses. Hence, the IR signaling for one manufacturer may differ from that of another manufacturer. Accordingly, in addition to or instead of re-transmission of the sync signal in the form consistent with a single manufacturer, a translation can be carried out so as to produce synchronization signals as an output for another manufacturer instead of or in addition to that of the manufacturer of the television set. Other variations will occur to those skilled in the art upon consideration of the present teachings.

Thus, in accord with certain embodiments consistent with the present invention, a repeater device for synchronized stereoscopic 3D active shutter glasses has a television remote controller housing that provides a user interface that provides access to controls for television functions. The television remote controller housing encloses a remote controller command processor situated in said housing that processes input from the user interface to interpret user commands and command transmitter that transmits signals under control of the remote controller command processor. It further encloses a synchronization signal receiver that receives shutter glasses synchronization signals, where the shutter glasses synchronization signal received by the synchronization receiver comprises an RF synchronization signal, and a converter that translates the RF synchronization signal to an IR synchronization signal. It further encloses a synchronization signal re-transmitter that receives the shutter glasses synchronization signal and re-transmits the shutter glasses synchronization signal as an IR synchronization signal. The command transmitter transmits command signals using an IR transmitter in the low frequency range of the IR spectrum and the synchronization signal re-transmitter transmits synchronization signals in the higher frequency range of the IR spectrum.

Another repeater device for synchronized stereoscopic 3D active shutter glasses consistent with certain implementations has a television remote controller housing that provides a user interface that provides access to controls for television functions. The television remote controller housing encloses a remote controller command processor situated in said housing that processes input from the user interface to interpret user commands and a command transmitter that transmits signals under control of the remote controller command processor, The remote controller housing also encloses a synchronization signal receiver that receives shutter glasses synchronization signals, and a synchronization signal re-transmitter that receives the shutter glasses synchronization signal and re-transmits the shutter glasses synchronization signal.

In certain implementations, the repeater device according to claim 2, where the shutter glasses synchronization signal received by the synchronization receiver comprises an RF synchronization signal. In certain implementations, the shutter glasses synchronization signal received by the synchronization receiver comprises an IR synchronization signal. In certain implementations, the shutter glasses synchronization signal transmitted by the synchronization signal re-transmitter comprises an RF synchronization signal. In certain implementations, the shutter glasses synchronization signal transmitted by the synchronization signal re-transmitter comprises an IR synchronization signal.

In certain implementations, the shutter glasses synchronization signal received by the synchronization receiver comprises an RF synchronization signal; where the shutter glasses synchronization signal transmitted by the synchronization signal re-transmitter comprises an IR synchronization signal; and further including a converter that translates the RF synchronization signal to an IR synchronization signal. In certain implementations, the command transmitter transmits command signals using an IR transmitter in a low frequency range of the IR-A spectrum and the synchronization signal re-transmitter transmits synchronization signals in a higher frequency range of the IR-A spectrum. In certain implementations, the command transmitter transmits commands at approximately 940 nm. In certain implementations, the synchronization signal re-transmitter transmits synchronization signals at approximately 850 to 880 nm. In certain implementations, the user interface comprises a power on/off control for at least one of the sync signal receiver and the sync signal re-transmitter. In another implementation, a translator translates the synchronization signals to translated synchronization signals compatible with shutter glasses that respond to the translated synchronization signals, and wherein the translated synchronization signals are the synchronization signals that are re-transmitted.

In another implementation, a 3D shutter glasses signal repeater device has a television remote controller housing that provides a user interface that provides access to controls for television functions and encloses a television remote controller circuit. A receiver receives a 3D shutter glasses synchronization signal. A transmitter re-transmits the shutter glasses synchronization signal.

In certain implementations, the shutter glasses synchronization signal received by the synchronization receiver comprises an RF synchronization signal. In certain implementations, the shutter glasses synchronization signal received by the synchronization receiver comprises an IR synchronization signal. In certain implementations, the shutter glasses synchronization signal transmitted by the synchronization signal re-transmitter comprises an RF synchronization signal. In certain implementations, the shutter glasses synchronization signal transmitted by the synchronization signal re-transmitter comprises an IR synchronization signal. In certain implementations, the shutter glasses synchronization signal received by the synchronization receiver comprises an RF synchronization signal; where the shutter glasses synchronization signal transmitted by the synchronization signal re-transmitter comprises an IR synchronization signal; and a converter translates the RF synchronization signal to an IR synchronization signal.

In certain implementations, the command transmitter transmits command signals using an IR transmitter in a low frequency range of the IR-A spectrum and the synchronization signal re-transmitter transmits synchronization signals in a higher frequency range of the IR-A spectrum. In certain implementations, a translator translates the synchronization signals to translated synchronization signals compatible with shutter glasses that respond to the translated synchronization signals before re-transmitting so that the translated synchronization signals are the synchronization signals that are the re-transmitted signals.

A method consistent with certain implementations involves at a television remote controller housing that provides a user interface that provides access to controls for television functions and encloses a television remote controller circuit: receiving a 3D shutter glasses synchronization signal; and re-transmitting the shutter glasses synchronization signal.

In certain implementations, the received shutter glasses synchronization signal comprises an RF synchronization signal. In certain implementations, the received shutter glasses synchronization signal comprises an IR synchronization signal. In certain implementations, the re-transmitted shutter glasses synchronization signal comprises an IR synchronization signal. In certain implementations, the re-transmitted shutter glasses synchronization signal comprises an RF synchronization signal. In certain implementations, the received shutter glasses synchronization signal comprises an RF synchronization signal; where the re-transmitted shutter glasses synchronization comprises an IR synchronization signal; and further involving converting the RF synchronization signal to an IR synchronization signal. In certain implementations, the method further involves translating the synchronization signals to translated synchronization signals compatible with shutter glasses that respond to the translated synchronization signals prior to the re-transmitting.

While certain illustrative embodiments herein were described in conjunction with specific circuitry that carries out the functions described, other embodiments are contemplated in which certain of the circuit functions are carried out using equivalent processes executed on one or more programmed processors. General purpose computers, microprocessor based computers, micro-controllers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware and/or dedicated processors.

Certain embodiments may be implemented using a programmed processor executing programming instructions that in certain instances are broadly described above in flow chart form that can be stored on any suitable electronic or computer readable storage medium (such as, for example, disc storage, Read Only Memory (ROM) devices, Random Access Memory (RAM) devices, optical storage elements, magnetic storage elements, magneto-optical storage elements, flash memory, core memory and/or other equivalent volatile and non-volatile storage technologies). However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A device for synchronized stereoscopic 3D active shutter glasses, comprising:
   a television remote controller housing that provides a user interface that provides access to controls for television functions;
   the television remote controller housing enclosing:
   a television remote controller circuit comprising:
       a television remote controller command processor situated in said housing that processes input from the user interface to interpret user commands;
       a television command transmitter that transmits television control signals under control of the remote controller command processor; and
   a shutter glasses synchronization signal repeater configured to receive shutter glasses synchronization signals and retransmit shutter glasses synchronization signals comprising:
       a synchronization signal receiver that receives shutter glasses synchronization signals from a television, where the shutter glasses synchronization signal received by the synchronization receiver comprises an RF synchronization signal; and
       a converter that translates the RF synchronization signal to an IR synchronization signal;
       a synchronization signal re-transmitter that receives the shutter glasses synchronization signal and re-transmits the shutter glasses synchronization signal as an IR synchronization signal; and
   where the command transmitter transmits television command signals using an IR transmitter in a low frequency range of the IR spectrum and the synchronization signal re-transmitter transmits synchronization signals in a higher frequency range of the IR spectrum; and
   where the user interface comprises a power on/off control for at least one of said synchronization signal receiver and said synchronization signal re-transmitter.

2. A device for synchronized stereoscopic 3D active shutter glasses, comprising:
   a television remote controller housing that provides a user interface that provides access to controls for television functions;
   the television remote controller housing enclosing:
   a television remote controller circuit comprising:
   a television remote controller command processor situated in said television remote controller housing that processes input from the user interface to interpret user commands;

a television command transmitter that transmits television remote control signals under control of the remote controller command processor; and a 3D synchronization signal repeater configured to receive shutter glasses 3D synchronization signals and retransmit shutter glasses 3D synchronization signals comprising:

a 3D synchronization signal receiver that receives 3D shutter glasses synchronization signals from a television;

a 3D synchronization signal re-transmitter that receives the 3D shutter glasses synchronization signal and re-transmits the 3D shutter glasses synchronization signal and where the user interface comprises a power on/off control for at least one of said synchronization signal receiver and said synchronization signal re-transmitter.

3. The device according to claim 2, where the shutter glasses synchronization signal received by the synchronization receiver comprises an RF synchronization signal.

4. The device according to claim 2, where the shutter glasses synchronization signal received by the synchronization receiver comprises an IR synchronization signal.

5. The device according to claim 2, where the shutter glasses synchronization signal transmitted by the synchronization signal re-transmitter comprises an RF synchronization signal.

6. The device according to claim 2, where the shutter glasses synchronization signal transmitted by the synchronization signal re-transmitter comprises an IR synchronization signal.

7. The device according to claim 2, where:
the shutter glasses synchronization signal received by the synchronization receiver comprises an RF synchronization signal;
where the shutter glasses synchronization signal transmitted by the synchronization signal re-transmitter comprises an IR synchronization signal; and
further comprising a converter that translates the RF synchronization signal to an IR synchronization signal.

8. The device according to claim 2, where the command transmitter transmits command signals using an IR transmitter in a low frequency range of the IR-A spectrum and the synchronization signal re-transmitter transmits synchronization signals in a higher frequency range of the IR-A spectrum.

9. The device according to claim 8, where the command transmitter transmits commands at approximately 940 nm.

10. The device according to claim 8, where the synchronization signal re-transmitter transmits synchronization signals at approximately 850 to 880 nm.

11. The device according to claim 2, further comprising a translator that translates the synchronization signals to translated synchronization signals compatible with shutter glasses that respond to the translated synchronization signals, and where the translated synchronization signals are the synchronization signals that are re-transmitted.

12. A 3D shutter glasses signal device, comprising:
a television remote controller housing that provides a user interface that provides access to controls for television functions and encloses a television remote controller circuit and further encloses a 3D shutter glasses synchronization signal repeater;
the 3D shutter glasses synchronization signal repeater being configured to receive 3D shutter glasses synchronization signals and retransmit 3D shutter glasses synchronization signals comprising:
a synchronization signal receiver residing within the television remote controller housing that receives a 3D shutter glasses synchronization signal from a television; and
a synchronization signal re-transmitter residing within the television remote controller housing that re-transmits the 3D shutter glasses synchronization signal and
where the user interface comprises a power on/off control for at least one of said synchronization signal receiver and said synchronization signal re-transmitter.

13. The device according to claim 12, where the shutter glasses synchronization signal received by the synchronization receiver comprises an RF synchronization signal.

14. The device according to claim 12, where the shutter glasses synchronization signal received by the synchronization receiver comprises an IR synchronization signal.

15. The device according to claim 12, where the shutter glasses synchronization signal transmitted by the synchronization signal re-transmitter comprises an RF synchronization signal.

16. The device according to claim 12, where the shutter glasses synchronization signal transmitted by the synchronization signal re-transmitter comprises an IR synchronization signal.

17. The device according to claim 12, where:
the shutter glasses synchronization signal received by the synchronization receiver comprises an RF synchronization signal;
where the shutter glasses synchronization signal transmitted by the synchronization signal re-transmitter comprises an IR synchronization signal; and
further comprising a converter that translates the RF synchronization signal to an IR synchronization signal.

18. The device according to claim 12, where the television remote controller circuit includes a command transmitter that transmits command signals using an IR transmitter in a low frequency range of the IR-A spectrum and the synchronization signal re-transmitter transmits synchronization signals in a higher frequency range of the IR-A spectrum.

19. The device according to claim 12, further comprising a translator that translates the synchronization signals to translated synchronization signals compatible with shutter glasses that respond to the translated synchronization signals before re-transmitting so that the translated synchronization signals are the synchronization signals that are the re-transmitted signals.

20. A method, comprising:
at a television remote controller housing that provides a user interface that provides access to controls for television functions and encloses a television remote controller circuit and further encloses a 3D shutter glasses synchronization signal repeater configured to receive 3D shutter glasses synchronization signals at a synchronization signal receiver and retransmit 3D shutter glasses synchronization signals at a synchronization signal re-transmitter comprising:
at a user interface receiving a power on control signal for at least one of said synchronization signal receiver and said synchronization signal re-transmitter;
responsive to the power on control signal, enabling power to the at least one of said synchronization signal receiver and said synchronization signal re-transmitter;
receiving a 3D shutter glasses synchronization signal; and
re-transmitting the 3D shutter glasses synchronization signal.

21. The method according to claim 20, where the received shutter glasses synchronization signal comprises an RF synchronization signal.

22. The method according to claim 20, where the received shutter glasses synchronization signal comprises an IR synchronization signal.

23. The method according to claim 20, where the re-transmitted shutter glasses synchronization signal comprises an IR synchronization signal.

24. The method according to claim 20, where the re-transmitted shutter glasses synchronization signal comprises an RF synchronization signal.

25. The method according to claim 20, where:
the received shutter glasses synchronization signal comprises an RF synchronization signal;
where the re-transmitted shutter glasses synchronization comprises an IR synchronization signal; and
further comprising converting the RF synchronization signal to an IR synchronization signal.

26. The method according to claim 20, further comprising translating the synchronization signals to translated synchronization signals compatible with shutter glasses that respond to the translated synchronization signals prior to the re-transmitting.

27. A device for synchronized stereoscopic 3D active shutter glasses, comprising:
a television remote controller housing that houses a user interface configured to provide access to controls for television functions;
the television remote controller housing enclosing:
a television remote controller circuit comprising:
a television remote controller command processor situated in said housing configured to process input from the user interface to interpret user commands;
a television command transmitter configured to transmit signals under control of the remote controller command processor; and
a 3D shutter glasses synchronization signal repeater configured to receive 3D shutter glasses synchronization signals and retransmit 3D shutter glasses synchronization signals comprising:
a 3D synchronization signal receiver configured to receive 3D shutter glasses synchronization signals from a television; and
a 3D synchronization signal re-transmitter configured to receive the 3D shutter glasses synchronization signal and re-transmit the 3D shutter glasses synchronization signal; and
where the user interface comprises a power on/off control for at least one of said synchronization signal receiver and said synchronization signal re-transmitter.

28. The device according to claim 27, further comprising a power control accessible via the user interface to regulate an amount of power used to re-transmit the 3D shutter glasses synchronization signal.

* * * * *